(12) United States Patent
Killadi et al.

(10) Patent No.: US 10,694,500 B2
(45) Date of Patent: Jun. 23, 2020

(54) COMMUNICATION CHANNELS BETWEEN ACCESS POINTS AND NETWORK ZONES

(71) Applicant: Hewlett Packard Enterprise Development LP, Houston, TX (US)

(72) Inventors: Srinivas Rao Killadi, Bangalore (IN); Indu Shree Akasapu, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 192 days.

(21) Appl. No.: 15/945,025

(22) Filed: Apr. 4, 2018

(65) Prior Publication Data

US 2019/0313373 A1  Oct. 10, 2019

(51) Int. Cl.
*H04W 72/04* (2009.01)
*H04W 76/12* (2018.01)

(52) U.S. Cl.
CPC ........... *H04W 72/04* (2013.01); *H04W 76/12* (2018.02)

(58) Field of Classification Search
None
See application file for complete search history.

(56) References Cited

U.S. PATENT DOCUMENTS

| | | | |
|---|---|---|---|
| 9,609,590 B2* | 3/2017 | Chandrasekaran | ........................ H04W 52/0209 |
| 2002/0022483 A1* | 2/2002 | Thompson | .......... H04L 12/1464 455/439 |
| 2005/0141468 A1* | 6/2005 | Kim | ....................... H04W 76/10 370/338 |
| 2006/0056297 A1* | 3/2006 | Bryson | ............... H04L 63/0272 370/230 |
| 2013/0058331 A1* | 3/2013 | Thakkar | .............. H04L 41/0896 370/389 |
| 2013/0163515 A1* | 6/2013 | Yeoh | ..................... H04W 88/08 370/328 |
| 2014/0071975 A1* | 3/2014 | Karino | .................. H04W 76/11 370/338 |
| 2016/0198501 A1* | 7/2016 | Verkaik | ................... H04W 8/04 370/329 |
| 2018/0227969 A1* | 8/2018 | Verkaik | .................... H04W 8/04 |
| 2018/0359799 A1* | 12/2018 | Huang | ................ H04L 63/0209 |
| 2018/0376385 A1* | 12/2018 | Killadi | .................. H04W 28/08 |

OTHER PUBLICATIONS

AP 320 Dual Ports, (Research Paper), Feb. 28, 2013, 11 Pgs.

(Continued)

*Primary Examiner* — Ayaz R Sheikh
*Assistant Examiner* — Faiyazkhan Ghafoerkhan
(74) *Attorney, Agent, or Firm* — Hewlett Packard Enterprise Patent Department (57) ABSTRACT

In an example, an access point includes a first and second Ethernet port, a processing resource and a memory resource storing machine readable instructions. The machine readable instructions may be to cause the processing resource to create a first communication channel between the access point and a first network zone using the first Ethernet port and to create a second communication channel between the access point and a second network zone using the second Ethernet port. The first and second network zones may be independently configured with respective first and second zone controllers and the first and second communication channels may exist simultaneously.

15 Claims, 5 Drawing Sheets

(56) References Cited

OTHER PUBLICATIONS

LAG on 1800/2800/3800 AP, (Research Paper), Apr. 19, 2017, 4 Pgs.
Link Aggregation for AP 225 Uplinks, (Research Paper), Jan. 17, 2014, 12 Pgs,.
Link Aggregation Support on Ap-220 Series, Ap-270 Series, and Ap-320 Series, (Research Paper), Aug. 26, 2014, 3 Pgs.

* cited by examiner

COMMUNICATION CHANNELS BETWEEN ACCESS POINTS AND NETWORK ZONES

BACKGROUND

In some networks, an access point (AP) may act as a transceiver, forwarding data to and from processing resources or client devices. In some examples, the client devices may be divided between a plurality of zones, which may be configured independently of one another, for example comprising separate network zone controllers, but may be part of a collectively administrated domain. In some such examples, there may be no physical connection between the zones. The network zone controllers may, for example, manage network attributes such as an AP's radio frequency channel selection, transmit power levels, security and policy controls and the like within the wireless network provided by the AP to the associated zone.

BRIEF DESCRIPTION OF DRAWINGS

Non-limiting examples will now be described with reference to the accompanying drawings, in which.

DETAILED DESCRIPTION

The following discussion is directed to various examples of the disclosure. The examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to. The term "based on" means based at least in part on.

In some examples, a multi-zone Access Point (AP) may be provided in a multi-zone network. The network zones may be independently configured by respective network zone controllers. The independent configuration of the zones by their respective network zone controllers may for example allow one zone to have a different security configuration to another zone. At least some non-primary zones may fail and reboot separately. The zones may have separate and distinct Service Set Identifications (SSIDs), which may be Extended SSIDs (ESSIDs), for example in some wireless networks. In some examples, the multi-zone AP may establish a communications tunnel for each network zone (for example, Generic Routing Encapsulation (GRE) tunnels, or through use of another tunnelling protocol) which terminate with the respective controllers of the network zones.

In such examples, a single AP may serve to forward network traffic to and from a plurality of network zones, wherein each zone may be independently configured (such that at least one attribute thereof may differ from zone to zone) and/or managed.

In some such examples, a single AP may serve two types of network zones, a primary zone and at least one data zone. Each network zone may comprise a zone controller and one more network zone client devices. The AP may provide wireless communications services to the network zone client devices, which in some examples may comprise user devices, for example, laptop(s), mobile telephone(s), tablet computer(s), desktop computer(s), or other devices such as router(s), kiosk(s), point of sales device(s) and the like. A zone controller may for example comprise hardware comprising a processing resource, memory, an operating system and the like. A zone controller may, for example, manage network attributes such as the AP's radio frequency channel selection, transmit power levels, security and policy controls and the like within that network zone, such that the network attributes of one network zone served by the AP may differ (or at least be independently configured) from the network attributes of another zone served by the AP.

A primary network zone and a data network zone may differ from one another in that the primary network zone may take more of a role in management of the multi-zone network. For example, the primary zone may take more of a role in establishing the multi-zone network.

In examples, on boot-up, a multi-zone AP may initially communicate with a primary zone controller, and management and configuration of the multi-zone aspects of the AP may take place as a result of that communication. This may for example comprise configuration of the IP addresses of the zone controllers within the network zones. In one example, the AP may receive a virtual access point configuration from the primary zone, along with multi-zone profile configuration data, which may for example comprise the IP addresses for the network zone controllers of the data zones. A communication tunnel from the AP which terminates on the primary zone controller may be established.

Once a multi-zone profile is configured on the AP, the AP may connect to at least one data zone. This may comprise, following receipt of the address of the network controller of a data zone (a network zone controller), registering with the network zone controller of that data zone. In one example, a registration message may be sent by the AP to indicate that the AP is registering itself as the AP of a data zone. A communication tunnel from the AP which terminates on each zone controller may be established.

In some examples, the data zones network zone controllers may each provide a virtual AP configuration for that data zone to the AP.

In general, the configuration may be such that reboots or changes to an AP image are not provided by data zones, instead being provided by the primary zone. In some examples, the data zones may operate only with specified communications protocols, for example only supporting tunnel mode Virtual AP (VAP) profile configuration, whereas the primary zone may be less limited.

Figure 1:
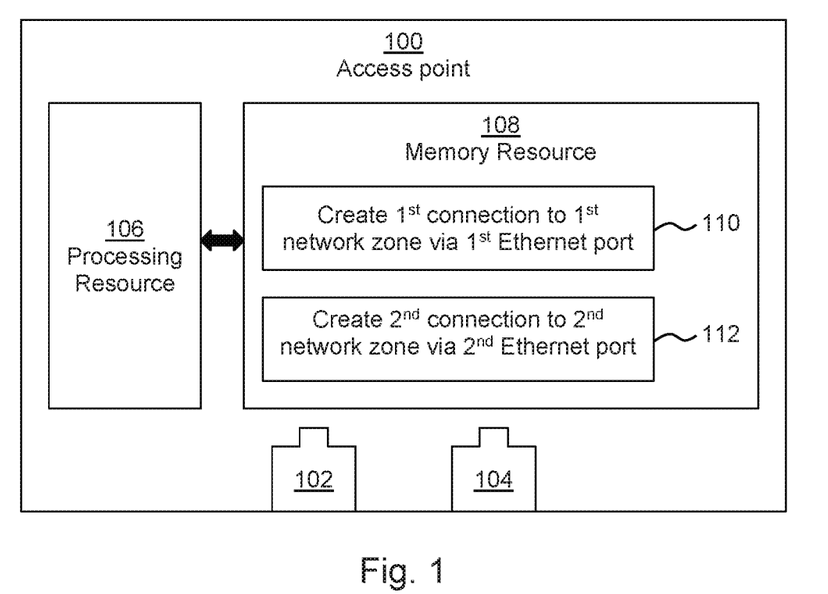
FIG. 1 is a block diagram of an example access point.

FIG. 1 is an example of an access point 100, which in this example comprises a multi-zone access point. The access point 100 comprises a first Ethernet port 102, a second Ethernet port 104, a processing resource 106 and a memory resource 108. The second Ethernet port 104 is different from the first Ethernet port 102. The memory resource 108 may store machine readable instructions to cause the processing resource 106 to carry out certain actions. In this example, the memory resource 108 stores instructions 110 to cause the processing resource 106 to create a first communication channel between the first Ethernet port 102 and a first network zone and instructions 112 to cause the processing resource 106 to create a second communication channel between the second Ethernet port 104 and a second network zone, wherein the first and second network zones are independently configured with respective first and second network zone controllers, and the first and second communication channels exist simultaneously for at least a period of time. More particularly, in some examples, the first and second communication channels may be established between an IP address of the AP and an IP address of a network zone controller using the respective Ethernet ports.

In some examples, the communication channels may each comprise a point to point connection, for example a communication channel based on Port Aggregation Protocol (PAgP), Link Aggregation Control protocol (LACP), Unidirectional Link Detection (UDLD) and/or a Generic Routing Encapsulation (GRE) tunnel. In some examples, the communications channels are secure communications channels. A communication channel may be a connection between a network zone and a virtual access point configured on the access point 100.

In general, a multi-zone access point may be configured with a first Ethernet port and a second, backup Ethernet port. Providing a backup Ethernet port may reduce the occasions where the access point becomes inoperative by providing a backup in the event that the first Ethernet port goes out of service. In other words, at any one time, a single Ethernet port serves all of the network zones. This can result in a 'bottle neck' being created in data sent via the AP, which may in turn lead to traffic being dropped. However, by allowing the first and second communication channels to exist simultaneously, with the first and second Ethernet ports both being used to provide the terminal of communication channels to network zone controllers, the network traffic through-put of an AP may be increased. As instances where an Ethernet port failure occurs without an access point as whole going out of service are rare, this may not reduce the reliability of the access point unduly.

The processing resource 106 and memory resource 108 may be any combination of hardware and programming to implement the described functionalities. In examples described herein, such combinations of hardware and programming may be implemented in a number of different ways. For example, programming may be processing resource executable instructions stored on at least one non-transitory machine readable storage medium and the hardware may include at least one processing resource to execute those instructions. In some examples, the hardware may also include other electronic circuitry to at least partially implement at least one of the processing resource 106. In some examples, the at least one machine readable storage medium may store instructions that, when executed by the at least one processing resource 106, at least partially implement the processing resource 106. In such examples, an access point 100 at least partially implementing the processing resource 106 may include the at least one machine readable storage medium storing the instructions and the at least one processing resource 106 to execute the instructions. In other examples, the processing resource 106 may be implemented by electronic circuitry.

Figure 2:
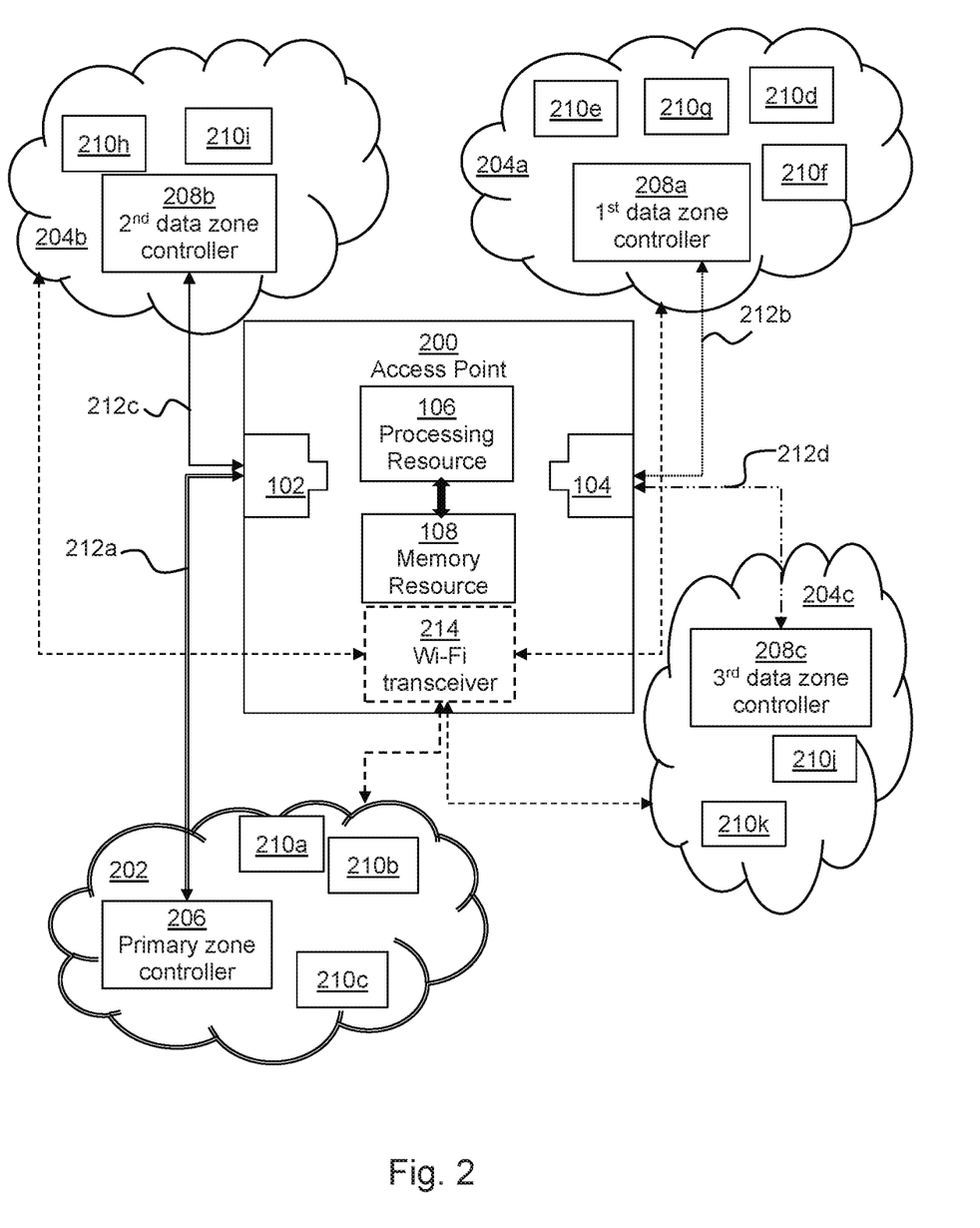
FIG. 2 is a block diagram of an example access point in a multi-zone network.

FIG. 2 shows an example of an access point 200 in use. The access point 200 comprises the first Ethernet port 102, a second Ethernet port 104, a processing resource 106 and a memory resource 108 of the access point 200 of FIG. 1 and is shown in association with four network zones 202, 204a, 204b, 204c. A first network zone 202 is a primary zone and a second, third and fourth network zones 204a-c are data zones.

The primary zone 202 comprises a primary zone controller 206 and the second, third and fourth network zones 204a-c comprise a second, third and fourth network zone controller (labelled as the first, second and third data zone controllers) 208a-c respectively.

Each of the network zones 202, 204a, 204b, 204c comprises at least one client device 210a-210k, which are client devices of the respective network zone 202, 204a, 204b, 204c. For example, the client devices may comprise any of, or any combination of, laptops, mobile telephone, tablet computers, routers, desktop computers, kiosk, point of sales devices and the like.

Communication channels between the AP (for example, between virtual access points configured on the AP) and the network zone controllers 206, 208a-c may comprise any point to point connection, and in some examples comprise secure point to point connections, and in this example comprise Generic Routing Encapsulation (GRE) tunnels 212a-d. Some of the GRE tunnels 212a, c may terminate at the first Ethernet port 102 whereas others of the GRE tunnels 212b, d may terminate at the second Ethernet port 104.

In this example, for the sake of illustration, the client devices 210 of the network zones 202, 204a, 204b, 204c are linked to a Wi-Fi transceiver 214 of the access point 200 by wireless connection, although in other examples, other arrangements are possible.

In an example, in use of the access point 200, the processing resource 106 receives a first virtual access point configuration from the first network zone, in one example the primary zone controller 206 of primary zone 202, and configures a first virtual access point for the first network zone (e.g. the primary zone 202). The first communication channel (in this example the GRE tunnel 212a) is configured to connect the first network zone controller 206 (i.e. in this example, the controller for the primary zone 202) to the first virtual access point using the first Ethernet port 102. The processing resource 106 may also receive a second virtual access point configuration from a second network zone (e.g. from a network zone controller 208a-c of the first, second or third data zones 204), configure a second virtual access point for the second network zone and create the second communication channel to connect the second network zone controller 108a to the second virtual access point using the second Ethernet port 104.

When data traffic for or from a controller 206,208 is sent via the access point 200, it is bridged via the particular Ethernet port associated with the network zone controller 206, 208 for the network zone 202, 204a-c of that client device 210. Thus, as shown in the Figure, primary network zone traffic is bridged to the controller 206 via the first Ethernet port 102 and the first network zone traffic is bridged to the controller 208a via the second Ethernet port 104.

In this example, in use of the access point 200 (for example during a boot-up process thereof, when the access point 200 is configuring itself as a multi-zone access point), the processing resource 106 selects the Ethernet port 102, 104 for a communication channel to a network zone based on an identifier of the network zone. In this example, the identifier may be based on a network zone number. For example, communication channels of odd numbered network zones may be formed using the first Ethernet port 102, and communication channels of even numbered zones may be formed using the second Ethernet port 104.

In this example, the first network zone 202 (the primary zone) is zone 1, the second, third and fourth network zones 204a-c are zones 2 to 4 respectively. Therefore, the first and the third network zones 202, 204b (the primary zone and the second data zone) are associated with the first Ethernet port 102 and the second and fourth network zones (the first and third data zones 204a, 204c) are associated with the second Ethernet port 104. In another example, the primary zone may be labelled as zone 0, and the second, third and fourth network zones 204a-c may be tabled as zones 1 to 3 respectively. In some examples, as well as a network zone identifier providing a number for a network zone, the network zones may be associated with a unique (within the zones served by the access point 200) Service Set Identification (SSID), which may be Extended SSIDs (ESSIDs), and which may be any alphanumerical string.

In this example, the processing resource 106, in use of the access point 200, generates a look-up table recording the association between the network zone controllers 206, 208 and the respective Ethernet ports (for example mapping the network zones to Ethernet ports) and the memory resource 108 stores the look-up table. Traffic of a particular network zone may be bridged to a corresponding GRE tunnel via an Ethernet port according to the data stored in the look-up table.

While in this example, there is a single network zone controller for each network zone, there may be multiple controllers in any one network zone 202, 204.

Figure 3:
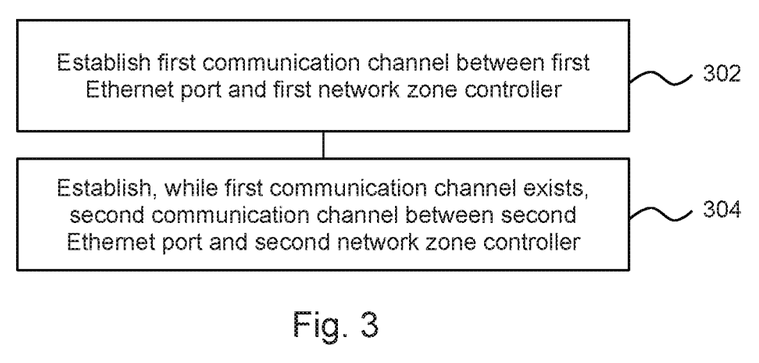
FIG. 3 is a flow chart of an example of a method of configuring an access point.

FIG. 3 is an example of a method, which may be a computer implemented method and may be a method of configuring a multi-zone access point. Block 302 comprises establishing a first communication channel between a network access point and a first network zone controller using a first Ethernet port of the access point. In some examples, the communication channel may be a secure communication channel and may use a tunnelling protocol such as GRE.

Block 304 comprises establishing, while the first communication channel exists, a second communication channel, wherein the second communication channel is formed between the network access point and a second network zone controller using a second Ethernet port of the access point. In some examples, the method may be carried out by the access point 100, or 200 of FIG. 1 or FIG. 2. In some examples, the communication channel may be a secure communication channel and may use a tunnelling protocol such as GRE.

Figure 4:
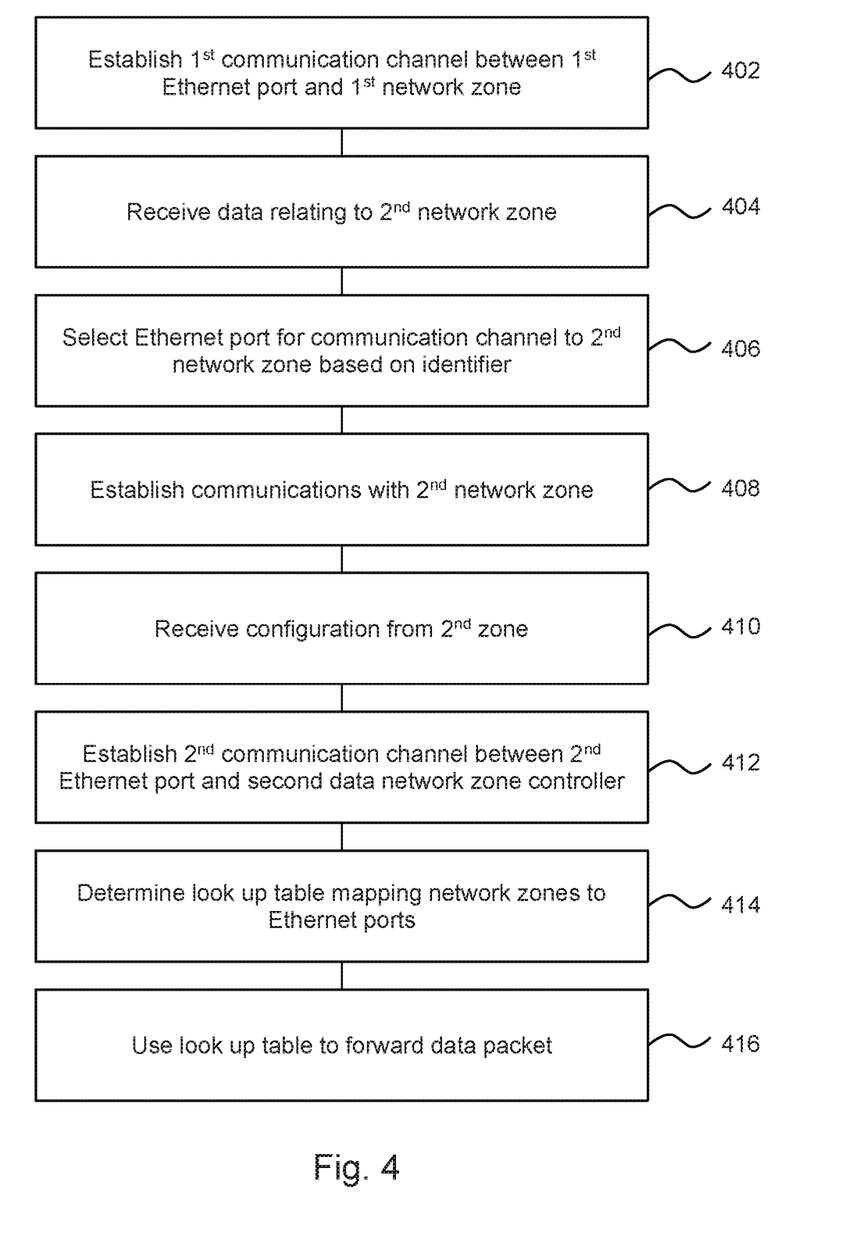
FIG. 4 is a flow chart of an example of a method of configuring and sending data an access point.

FIG. 4 is an example of a method, which may be a computer implemented method and may be a method of configuring a multi-zone access point. Block 402 comprises establishing a first communication channel between the AP and a first network zone controller, which in this example is the primary network zone controller, using a first Ethernet port. Establishing the communication channel may for example comprise sending messages between the AP and the primary network zone (or more specifically in some examples, the primary zone controller), for example using a lightweight communications protocol, such as User Datagram Protocol (UDP), or any other communication protocol suited to bootstrapping. In other examples, the protocol may for example comprise Transmission Control Protocol (TCP) or the like. The channel may be a secure communication channel, for example using a tunnelling protocol, between the IP address of the AP and the Internet Protocol (IP) address of a controller of the first network zone.

Block 404 comprises receiving, at the AP and from the first (i.e. primary) network zone (for example, from a network zone controller thereof) data relating to a second network zone, in this example a data network zone. In some examples, the primary network zone may transmit a multi-zone configuration to the AP using a 'bootstrapping' communications protocol such as UDP. In this example, the data comprises network zone identifiers, which may be the numeric identifier and/or the network zone Identity (e.g. an SSID or ESSID or the like) and/or the IP addresses at least one entity of each network zone. In some examples, the data comprises an IP address of a controller of the second network zone (or, in some examples, of the controllers all the existing (or to be configured) network zones of the multi-zone network).

Block 406 comprises selecting, by processing resource of the AP, the Ethernet port for a communication channel to the second network zone according to an identifier. In some examples, this may be based on the identifier of the network zone received from the primary zone. In other examples, identifiers may be assigned by the AP, for example according to the order with which network zones are identified in the multi-zone communication, or based on the order in which network zones respond to communications or the like. In this example, the selected Ethernet port is the second Ethernet port.

Block 408 comprises establishing, by a processing resource of the AP, communications with the second network zone. This may comprise sending at least one message to the second network zone (for example, to a controller thereof) by a lightweight communication protocol such as UDP, although in other examples, other communication protocols such as TCP may be used. In some examples, establishing communications may comprise sending (for example as a unicast message) a 'hello' message to an IP address for the second network zone controller indicated in the multi-zone configuration as described above with reference to block 404. Such a 'hello' message may for example comprise a flag indicating the AP is registering itself on the controller as the AP. In some examples, the hello message or a subsequent message may also identify a version of the AP, AP group information and the like. Such messages may be sent using the first Ethernet port.

Block 410 comprises receiving a virtual access point configuration from the second network zone. This may comprise sending at least one message by a lightweight communication protocol such as UDP, although in other examples, other communication protocols such as TOP may be used.

Block 412 comprises establishing a second communication channel, wherein the second communication channel is established between the AP and the second data network zone controller using the second Ethernet port, and is based on the virtual access point configuration. In some examples, a virtual access point (VAP) corresponding to the virtual access point configuration may be established on the AP.

In practice, the method of blocks 404 to 412 may be iterated for all existing (or to be configured) data zones.

Block 414 comprises determining a look up table mapping network zones to the Ethernet ports to which they are associated. Block 416 comprises, on receipt of a data packet for a network zone, using the look up table to forward the data packet. Thus, subsequently, when sending at least some data to and from the first network zone, the data is sent via the first communication channel, and therefore via the first Ethernet port. At least some data sent to and from the second network zone is sent via the second connection, and therefore via the second Ethernet port. However in some examples, all control communications are sent via the first Ethernet port, which is associated with the primary zone in this example.

In examples, where a secure tunnel such as a GRE tunnel is used, the AP may also encapsulate the data before forwarding the data.

Figure 5:
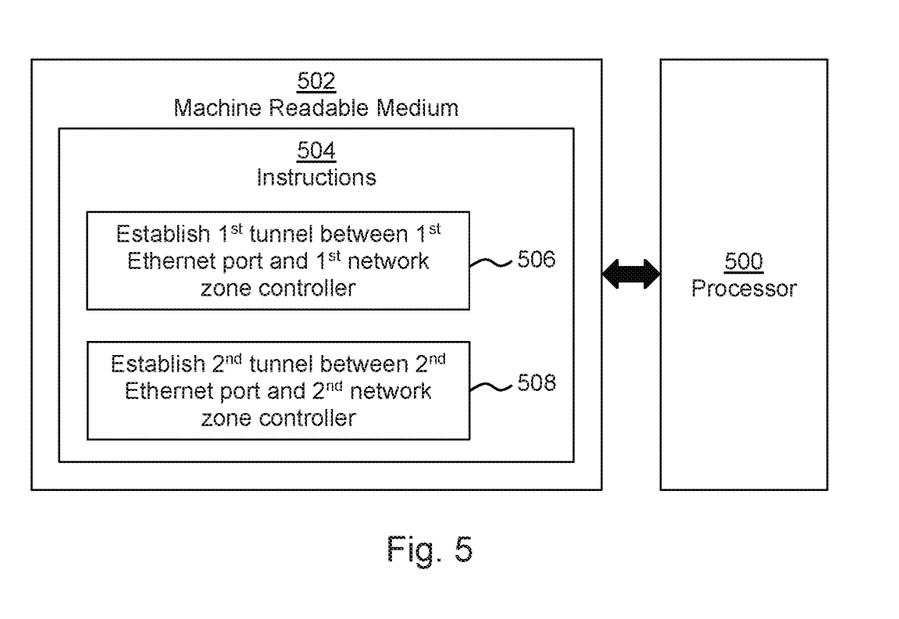
FIG. 5 is a representation of a machine readable medium in association with a hardware processor.

FIG. 5 shows an example of a hardware processor 500 in association with a machine readable medium 502. The machine readable medium 502, which may be a tangible and/or non-transitory machine readable medium, stores instructions 504 which, when executed by the processor 500, causes performance of operations. In this example, the instructions 504 comprise instructions 506 to cause the processor 500 to establish a first secure tunnel (for example, a GRE tunnel) between a network access point and a first network zone controller using a first Ethernet port and instructions 508 to establish a second secure tunnel (for example, a GRE tunnel), wherein the second secure tunnel is formed between the network access point and a second network zone controller using a second Ethernet port, and the first and second secure tunnels exist simultaneously.

In some examples, the instructions 504 further comprise instructions which, when executed by the hardware processor 500, cause performance of operations comprising (i) receiving, via the first secure tunnel, data relating to the second network zone, (ii) establishing communications with the second network zone and receiving a virtual access point configuration; and (iii) creating the second secure tunnel based on the virtual access point configuration. The instructions 504 further comprise instructions which, when executed by the hardware processor 500, cause performance of operations comprising configuring a virtual access point on the access point based on the virtual access point configuration.

In other examples, the hardware processor 500 may be provided by one or more hardware processors.

In examples described herein, a processing resource may include, for example, one processing resource or multiple processing resources included in a single computing device or distributed across multiple computing devices. As used herein, a "processing resource" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine readable storage medium, or a combination thereof.

In examples described herein, entities (e.g. controllers and/or client devices) may communicate with one another via direct connections, via one or more computer network, or a combination thereof. In examples described herein, a computer network may include, for example, a local area network (LAN), a virtual LAN (ULAN), a wireless local area network (WLAN), a virtual private network (VPN), the Internet, or the like, or a combination thereof.

In examples described herein, a memory resource may include, for example Random Access Memory (RAM), including any variant thereof (e.g. DRAM, SRAM, etc.).

Examples in the present disclosure can be provided as methods, systems or machine readable instructions, such as any combination of software, hardware, firmware or the like. Such machine readable instructions may be included on a machine readable storage medium (including but not limited to disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some flows and/or blocks in the flow charts and/or block diagrams, as well as combinations of the flows and/or blocks in the flow charts and/or block diagrams can be realized by machine readable instructions.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other processing resource may fulfil the functions of several units recited in the claims.

The features of any dependent claim may be combined with the features of any of the independent claims or other dependent claims, in any combination.

The invention claimed is:

1. An access point comprising:
a first Ethernet port;
a second Ethernet port that is different from the first Ethernet port;
a processing resource; and
a memory resource storing machine readable instructions to cause the processing resource to:
create a first communication channel between the access point and a first network zone using the first Ethernet port;
create a second communication channel between the access point and a second network zone using the second Ethernet port, wherein the first and second network zones are independently configured with respective first and second network zone controllers, wherein the first and second communication channels are to exist simultaneously, wherein the processing resource is to generate further communication channels between the access point and further network zones, wherein the Ethernet port selected for a communication channel to a network zone is selected according to an identifier of the network zone, where the identifier is a number and communication channels of odd numbered network zones are formed between the access point and the network zone using one of the first and second Ethernet port and communication channels of even numbered network zones are formed between the access point and the network zone using the other of the first and second Ethernet port.

2. The access point according to claim 1 wherein the processing resource is to:
receive a first virtual access point configuration from the first network zone, to configure a first virtual access point for the first network zone and to create the first communication channel to connect the first network zone controller to the first virtual access point using the first Ethernet port; and receive a second virtual access point configuration from the second network zone, to configure a second virtual access point for the second network zone and to create the second communication channel to connect the second network zone controller to the second virtual access point using the second Ethernet port.

3. The access point according to claim 2 wherein the access point comprises a wireless communication transceiver, the first network zone is a primary network zone and the second network zone is a data network zone, each of the network zones comprising at least one client device which is to communicate wirelessly via the wireless communication transceiver.

4. The access point according to claim 3 which is to receive from the primary network zone and via the first Ethernet port, data relating to the data network zone, and to use the data in configuring a multi-zone network.

5. The access point according to claim 1 wherein the processing resource is to generate a look up table recording an association between the first network zone and the first Ethernet port and the association between the second network zone and the second Ethernet port;
the memory resource is to store the look up table; and
the processing resource is to access the look up table when receiving network traffic addressed to the first or second network zone.

6. The access point according to claim 1 wherein at least one communication channel comprises a Generic routing encapsulation (GRE) tunnel.

7. A method comprising:
establishing, by an access point, a first communication channel between a network access point and a first network zone controller using a first Ethernet port of the network access point; and
while the first communication channel exists, establishing, by the access point, a second communication channel, wherein the second communication channel is formed between the network access point and a second network zone controller using a second Ethernet port of the access point,
generating further communication channels between the access point and further network zones, wherein the Ethernet port selected for a communication channel to a network zone is selected according to an identifier of the network zone, where the identifier is a number and communication channels of odd numbered network zones are formed between the access point and the network zone using one of the first and second Ethernet port and communication channels of even numbered network zones are formed between the access point and the network zone using the other of the first and second Ethernet port.

8. The method according to claim 7 wherein establishing the second communication channel comprises sending communications via the first Ethernet port.

9. The method according to claim 7 comprising establishing a plurality of communication channels between the access point and a plurality of controllers of different networks zones, the method further comprising selecting an Ethernet port for a communication channel to a network zone controller according to an identifier of the network zone.

10. The method according to claim 7 comprising determining a look up table mapping networks zones to the Ethernet ports to which they are connected.

11. The method according to claim 10 comprising, on receipt of a data packet for a network zone, using the look up table to forward the data packet.

12. The method according to claim 7 wherein the second network zone controller is a controller of a second network zone, the method comprising receiving data relating to the second network zone from the first network zone controller,
establishing communications with the second network zone and receiving a virtual access point configuration; and
establishing the second communication channel based on the virtual access point configuration.

13. A non-transitory machine readable medium comprising instructions which, when executed by one or more hardware processors, cause performance of operations comprising:
establishing a first secure tunnel between a network access point and a first network zone controller using a first Ethernet port of the network access point,
establishing a second secure tunnel, wherein the second secure tunnel is formed between the network access point and a second network zone controller using a second Ethernet port of the network access point,
generating further communication channels between the network access point and further network zones, wherein the Ethernet port selected for a communication channel to a network zone is selected according to an identifier of the network zone, where the identifier is a number and communication channels of odd numbered network zones are formed between the access point and the network zone using one of the first and second Ethernet port and communication channels of even numbered network zones are formed between the network access point and the network zone using the other of the first and second Ethernet port.

14. The non-transitory machine readable medium according to claim 13 further comprising instructions which, when executed by the one or more hardware processors, cause performance of operations comprising:
receiving, using the first Ethernet port, data relating to the second network zone,
establishing communications with the second network zone and receiving a virtual access point configuration; and
creating the second secure tunnel based on the virtual access point configuration.

15. The non-transitory machine readable medium according to claim 13 wherein the instructions to establish the first and second secure tunnels are instructions to establish Generic Routing Encapsulation (GRE) tunnels.

* * * * *